United States Patent [19]

Konishi

[11] Patent Number: 4,570,911
[45] Date of Patent: Feb. 18, 1986

[54] VIBRATION-DAMPING STRUCTURE
[75] Inventor: Keizo Konishi, Komaki, Japan
[73] Assignee: Tokai Rubber Industries, Ltd., Komaki, Japan
[21] Appl. No.: 546,423
[22] Filed: Oct. 28, 1983
[30] Foreign Application Priority Data Nov. 13, 1982 [JP] Japan .................................. 57-199603

[51] Int. Cl.$^4$ ............................ F16M 1/00; F16F 1/36
[52] U.S. Cl. ..................................... 267/8 R; 267/140.1
[58] Field of Search ............ 267/8 R, 35, 63 R, 140.1, 267/141, 141.2, 141.3, 113; 180/300; 248/562, 560, 613, 631, 636

[56] References Cited
U.S. PATENT DOCUMENTS 4,277,056 7/1981 Ticks .................. 267/140.1

FOREIGN PATENT DOCUMENTS 3210731 10/1983 Fed. Rep. of Germany ... 267/140.1
0066539 6/1981 Japan ................................ 267/140.1
0153133 11/1981 Japan ................................ 267/140.1

Primary Examiner—Bruce H. Stoner, Jr.
Assistant Examiner—Robert J. Oberleitner
Attorney, Agent, or Firm—Browdy and Neimark

[57] ABSTRACT

A vibration damper comprising an elastic block having a cavity open at its bottom end, a support integrally united with the elastic block, a partition of a rigid material disposed adjacent the bottom end of the elastic block so as to close the cavity to form an operating chamber on one side of the partition, a diaphragm disposed on the other side of the partition and cooperating with the same to define an equilibrium chamber, and an orifice for effecting communications between the operating and equilibrium chambers which are filled with incompressible fluid. At least a portion of the diaphragm is formed of a thin layer of flexible material so that the equilibrium chamber is variable in its volume. The rigid partition undergoes substantially no deformation upon input of a vibrational energy into the operating chamber. A ratio of a dynamic spring rate to a static spring rate of the damper is not greater than 2.1 for high-frequency vibrations of higher than 50 Hz.

17 Claims, 3 Drawing Figures

VIBRATION-DAMPING STRUCTURE

BACKGROUND OF THE INVENTION

The present invention relates in general to a vibration-damping structure, and more particularly to an elastic block structure such as an engine mount, excellent in its damping characteristics for both high- and low-frequency vibrations.

In the art of a vibration-damping elastic or rubber block structure used as an engine or body mount in an automotive vehicle, there has been known a structure including a rubber block interposed between two metal supports. Such elastic structure generally employs a rubber material having a low dynamic spring rate (constant) for improved noise isolation for high-frequency vibrarions, and consequently has a comparatively low loss factor (loss tangent) and damping coefficient. As a result, the known elastic structure suffers a low vibration-damping capability at low frequencies of vibrations, and is not completely satisfactory in meeting the properties required of an elastic vibration damping rubber mount.

On the other hand, another type of elastic vibration damper has been proposed, which utilizes resiliency of a rubber or elastic material and flow resistance of a fluid. This damper is known as a fluid-filled or fluid-containing damper, a typical example of such type of damper is disclosed in British Patent Specification No. 811748 wherein a cavity within a rubber mass is closed by a diaphragm to form on one side thereof a first fluid chamber which is filled with hydraulic fluid. This chamber is placed in fluid communication with a second chamber provided on the other side of the diaphragm, through a central orifice of suitable length and diameter formed in the diaphragm. In this arrangement, the fluid flowing from one chamber to the other will permit a high loss factor at low frequencies of vibrations.

Such fluid-filled damper, however, tends to have a difficulty in flow of the fluid through the orifice upon application of high-frequency vibrations, and suffers a problem of increased fluid pressure within the first chamber which necessarily results in increased dynamic spring rate, making it undesirable to use such damper as an elastic engine mount or the like. This increase in the dynamic spring rate for the high-frequency vibrations is a result of efforts to attempt to increase a variation in the volume in the first chamber for increasing a loss factor of the damper for low-frequency vibrations.

It is noted here that the dynamic properties of a fluid-filled elastic mount is a vectorial sum of the dynamic property of a rubber material and the dynamic property of the working fluid, i.e., the dynamic spring rate (Kd) of the elastic mount as a whole is expressed by the following equation:

$$Kd = Kd1 + Kd2$$

where:
Kd1: Dynamic spring rate of rubber material
Kd2: Dynamic spring rate of fluid Since the dynamic spring rate (Kd) of the fluid is determined by the fluid pressure, the dynamic spring rate (Kd) of the elastic mount is increased as the fluid pressure is increased, i.e., as the frequency level of the vibrations is elevated. Stated the other way, the fluid pressure is proportional to a variation in the volume of the fluid chamber upon application of the vibrations, and the loss factor is also proportional to the volume variation of the fluid chamber upon application of the vibrations.

In conclusion, the fluid-filled elastic mount discussed above is designed for increased variation in the volume of the fluid chamber for the purpose of obtaining a high loss factor for low-frequency vibrations, whereby the dynamic spring rate is necessarily elevated at high frequencies of vibrations.

To avoid an increase in the fluid pressure within the fluid-filled elastic mount at high frequencies, there is proposed in U.S. Pat. No. 4,159,091 a resilient damper device wherein a partition wall dividing a fluid chamber is provided with a movable part or movable plate which is freely movable in a direction perpendicular to the partition wall upon application of small-amplitude vibrations of high frequencies, thereby preventing a rise in the fluid pressure until the vibration frequency is elevated beyond a given level. In this fluid-filled mount, large-amplitude vibrations of low frequencies will cause the movable part or plate to be slightly moved until it is blocked by a stop. Subsequently, the fluid flows from one chamber to the other through an orifice formed in the movable part or plate, whereby a high loss factor is obtained.

However, the slight movement of the movable part or plate tends to give the elastic mount a lower loss factor as compared with that of a fluid-filled elastaic mount without a movable part or plate on the partition wall. Therefore, the elastic mount as disclosed in the above-identified U.S. Pat. is designed for increased variation in the volume of the fluid chamber and for increased fluid volume to obtain a higher loss factor (which leads to a high dynamic spring rate). In other words, the movable part or plate is used to lower the dynamic spring rate which is higher in the above design.

However, the fluid-filled elastic mount provided with a movable plate has a problem that a fluid mass or column supporting the movable plate undergoes a phenomenon of resonance oscillation at vibration frequencies higher than 50 Hz. The resonance frequency is determined by the diameter and the length of the fluid column, the configuration of a rubber or elastic block used, the static spring rate (Ks) of the elastic mount, etc. When such resonance occurs, the fluid pressure in the chamber varies to a great extent, and the dynamic spring rate which has been held at a low level is elevated. As a result, if the elastic mount is used as an engine mount, the transfer characteristics of vibrations, i.e., a force $[Kd \times (\text{amplitude of vibration})]$ to be transferred from an engine to a support structure of a vehicle, is increased and the vibrations coming from the engine are easily transferred to the support structure, whereby the noise isolation and ride comfort characteristics are degraded. In addition, the resonance oscillation will cause a large variation in the transfer of vibrations, which is not desirable as a characteristic of a vibration-damping structure, because a sudden change of vibrational transfer will result in variation in the level of sounds transferred to a passengers' compartment of the vehicle. Due to such variation in the sound level, the sounds are heard as noises unpleasant to the passengers. Hence, the engine mount is required to permit a smooth variation in the transfer of vibrations, i.e., to provide excellent transfer characteristics.

An improvement in a fluid-filled elastic mount having a movable plate as discussed above, is disclosed in German Offenlegungsschrift No. 3019337, wherein a ratio (L/D) of a length (L) of an orifice to a diameter (D) thereof is held within a range of 4–80 which is comparatively higher than that of an orifice of the prior counterpart, and the orifice is provided not in the movable plate, but in a member separate from the movable plate. While this improved type of fluid-filled elastic mount exhibits low Kd (dynamic spring rate) characteristics at low frequencies due to provision of the movable plate, it also suffers a resonance oscillation of the fluid mass supporting the movable plate upon application of vibrations of higher than 50 Hz, thereby creating problems of abrupt change in its transfer characteristics and increased value of Kd, that is, low transfer characteristics and low dynamic properties, and consequently low noise isolation, as experienced in the elastic mount previously described.

SUMMARY OF THE INVENTION

It is accordingly an object of the present invention, which was developed in view of the above background, to provide a vibration-damping structure utilizing a fluid medium but excluding a movable plate as used in the art.

Another object of the invention is to provide a vibration-damping structure which is capable of exhibiting: excellent damping properties with a high loss factor at low vibration frequencies; high vibration-absorbing capabilities with a high dynamic spring rate at high vibration frequencies; and good transfer characteristics with smooth variation in the transfer of vibrations from a vibration-generating element to a rigid support.

A futher object of the invention is to provide such excellent fluid-filled vibration-damping structure that is economical to manufacture and highly reliable in operation.

According to the present invention, there is provided a vabration-damping structure disposed in association with a vibration-generating element and a rigid support for connection of the former with the latter in a vibration damping manner. The vibration-damping structure comprises an elastic block having therein a cavity which is open at one end of the elastic block, support means integrally united with the elastic block, partition means disposed adjacent said one end of the elastic block so as to close the cavity in the elastic block and cooperating with the elastic block to define, on one side thereof, an operating chamber which is located substantially within the mass of the elastic block and filled with an incompressible fluid, a diaphragm disposed on the other side of the partition means and cooperating with the same to define, on said other side, an equilibrium chamber which is filled with the incompressible fluid, and passage means for defining an orifice connecting the operating and equilibrium chambers in fluid communication with each other. At least a portion of the diaphragm is formed of a thin layer of flexible material whereby the equilibrium chamber is variable in its volume. The partition means is made of a rigid material and constructed such that there is substantially no deformation thereof upon input of a vibrational energy into said operating chamber. The dynamic/static ratio of a dynamic spring rate of the vibration-damping structure to a static spring rate of the same is not greater than 2.1 for high-frequency vibrations of higher than 50 Hz.

As previously stated, the dynamic properties of a fluid-filled elastic mount or vibration-damping structure is a vectorial sum of the dynamic properties of an elastic or rubber block and the dynamic properties of a working fluid. For example, the dynamic spring rate Kd(100) of an elastic mount at 100 Hz is obtained by the following formula (I):

$$Kd(100) = Kd1(100) + Kd2(100) \qquad (I)$$

where,
Kd1(100): Kd of rubber block at 100 Hz
Kd2(100): Kd of fluid at 100 Hz

The Kd2(100) of the fluid is based on the fluid pressure within the elastic mount. As indicated before, the level of noises within a compartment of a running vehicle may be reduced by lowering the value of Kd(100) which, as is apparent from the formula (I), may be reduced by lowering either the value of Kd1(100) of the rubber block or the value of Kd2(100) of the fluid. The value of Kd1(100) of the rubber block may be lowered by either lowering the static spring rate Ks of the rubber block or improving the material of the rubber for reduction of the value Kd1(100). The lowering of the static spring rate Ks of the rubber block tends to degrade its durability. Thus, the static spring rate Ks of the rubber block can not be lowered below a certain limit. On the other hand, the improvement in the rubber material has a limitation in that the value of Kd can not be smaller than the value of Ks.

From the above analysis, it is understood that the value of Kd(100) in the formula (I) can only be reduced by employing the alternative method, i.e., by lowering the Kd2(100) of the fluid.

In light of the knowledges discussed hereinbefore, the inventor of the present application found that an increase in variation in the volume of a fluid chamber for a higher loss factor thereof at low frequencies will lead to a proportional increase in the dynamic spring rate Kd(100) as well as in the loss factor. Stated the other way, the inventor had a finding that the value of Kd(100) will be lowered as the variation in the volume of the chamber is reduced. This concept is absolutely opposite to the prior practiced concept of maintaining the volume variation at a higher level for higher loss factor. Thus, the instant finding is useful for alleviating the drawbacks due to high dynamic spring rate Kd(100), assuming the problem of low loss factor may be solved by a separate remedy. Further, it was recognized that the above concept of the instant invention could be embodied easily in a considerably simple construction.

The embodiment of the above concept requires a mere reversal of the prior design concept which is directed toward increase in the fluid volume variation. Thus, the value of Kd(100) in the preceding formula (I) of a fluid-filled damping structure may be lowered while the rubber material and the value of static spring rate are left unchanged.

In essence, the rubber material must be so selected as to provide a static spring rate Ks above a given lower limit for sufficient durability of the damping structure. Accordingly, the value of Kd1(100) of the rubber block in the preceding formula (I) can not be lowered to reduce the value of Kd(100) of the damping structure. This means that the value of Kd(100) of the damping structure must be and can be effectively lowered by way of lowering the value of Kd2(100) of the working fluid, as previously discussed. Further, this method can be simply practiced. Generally, capabilities of a damper upon application of high-frequency vibrations are evaluated by its value of Kd(100). This value, however, is reduced as the static spring rate Ks is reduced. Therefore, in evaluating dampers of different static values Ks, it is necessary to use a dynamic/static ratio Kd(100)/Ks of the dampers which is obtained by the following formula:

$$Kd(100)/Ks = [Kd1(100) + Kd2(100)/Ks]$$

where,
- Kd1(100): Dynamic spring rate of rubber block
- Kd2(100): Dynamic spring rate of fluid
- Ks: Static spring rate of the rubber block (=static spring rate of the elastic mount)

The damping capabilities of a damper are considered excellent when the dynamic/static ratio is low.

According to the analysis by the inventor, the variation in the fluid volume must be controlled to be low enough to assure that the dynamic/static ratio Kd/Ks is not greater than 2.1 for high-frequency vibrations of higher than 50 Hz, generally 50–200 Hz, in order to provide good damping characteristics at such high frequencies. Further, it was found necessary that the partition means disposed between two fluid chambers be provided with no such movable part or plate as used in the art, and be formed of a rigid material and constructed such that there is substantially no deformation thereof. This arrangement restricts the occurrence of a resonance oscillation of the fluid and permits a smooth variation in the transfer of vibrations upon change in the frequency of vibrations applied.

For improvement in a loss factor for low-frequency vibrations, the length/diameter ratio (L/D) of the orifice connecting the two fluid chambers is adapted to be high and the mass of the fluid within the orifice is kept large. In this design, the mass of the fluid within the orifice undergoes, at low frequencies, a resonance oscillation in a vibration system consisting of the fluid mass in the orifice and the elastic block or thin layer of a flexible material, thereby causing a high degree of phase difference in the fluid pressure between the fluid mass in the orifice and the fluid mass within the chamber. Thus, the vibration-damping structure of the invention has a relatively high loss factor at low frequencies even though the variation in the fluid volume is held at a low level. At high frequencies, on the other hand, the fluid is difficult to flow through the orifice of such L/D ratio and free from the stated resonance oscillation because the orifice is considerably narrow as compared with the diameter of the movable plate used in the known fluid-filled damper previously discussed. Therefore, the instant damping structure does not suffer a large or sudden variation in the fluid pressure when the frequency of vibrations is changed, i.e., exhibits smooth transfer characteristics.

As described before, the instant vibration-damping structure has a dynamic/static ratio of not greater than 2.1 for vibrations of higher than 50 Hz, which ratio is far lower than that of the prior dampers filled with a fluid. In the prior fluid-filled elastic mount without a movable plate, the dynamic/static ratio is 2.5 or greater because of the design for larger variation in the fluid volume to obtain a high loss factor at low frequencies. Further, the dynamic/static ratio of the prior fluid-filled elastic mount with a movable plate exceeds 4.0 if the partition wall is not provided with such movable plate. It is noted that the low dynamic/static ratio of the instant damping structure is obtained by minimizing the variation in the fluid volume during application of vibrations, contrary to the concept practiced in the known dampers. In addition, the instant structure has a high loss factor which is obtained through a unique design of the orifice connecting the operating and equilibrium chambers, more particularly, by selecting the length/diameter ratio (L/D) of the orifice within a suitable range that meets the principle of the invention.

BRIEF DESCRIPTION OF THE DRAWINGS

The above and other objects, features and advantages of the present invention will become more apparent from reading the following description of the preferred embodiments taken in connection with the accompanying drawings in which.

DETAILED DESCRIPTION OF THE PREFERRED EMBODIMENTS

Figure 1:
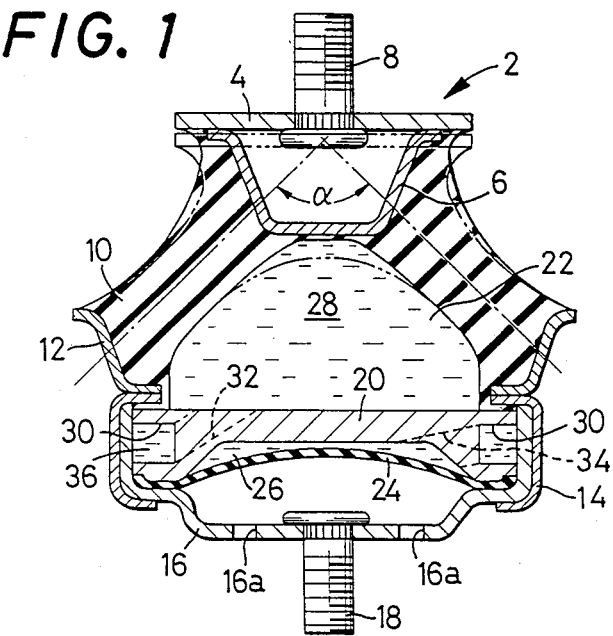
FIGS. 1 and 2 are cross sectional views of two preferred embodiments, respectively, of a vibration-damping structure of the present invention.

Referring first to FIG. 1, there is illustrated a preferred embodiment of a vibration-damping structure in the form of an engine mount comprising first support means in the form of a metal fitting 2 which includes a planar member 4 and a seat 6 of truncated cone shape secured to one side of the planar member 4. A fixing bolt 8 is attached to the planar member 4 so as to extend on the other side for connection of the engine mount to a member of an engine of a vehicle, i.e., a vibration-generating element. The truncated conical seat 6 is embedded in a head or top portion of an elastic block 10 of generally truncated conical configuration made of a rubber. Thus, the metal fitting 2 is integrally united with the elastic block 10. The other end of the elastic block 10, that is, the base or bottom portion thereof is tightly enclosed by a metal ring 12 so that the latter is integrally secured to the elastic block 10. The metal fitting 2, metal ring 12 and elastic block 10 are easily manufactured as an integral body through vulcanization of the elastic block 10 during forming of the same in a mold.

The integral body of the metal fitting 2, elastic block 10 and metal ring 12 is fixed to second support means which includes a bracket 14 and a cap member 16. More specifically, the metal ring 12 has at its lower end a flange portion to which is secured, as by welding, an upper flange portion of the bracket 14 such that a cylindrical portion of the cap member 16 is clamped between the upper flange portion and a lower flange portion of the bracket 14. A bolt 18 fixed to the cap member 16 extends outwardly for connection of the damping structure to a suitable rigid support, i.e., a structure of the vehicle. The cap member 16 has vents 16a through which the interior of the cap member communicates with the atmosphere.

The vibration-damping structure further comprises a circular partition plate 20 which is located in a plane perpendicular to a direction of input of a vibrational energy. This partition plate 20 closes a cavity formed in the bottom portion of the elastic block 10. Thus, the substantially flat surface on one side of the partition plate 20 cooperates with the inner surface of the elastic block 10 to define an operating chamber 22. The partition plate 20 is held at its periphery within the cylindrical portion of the cap member 16. A space below the other side (underside) of the partition plate 16 is fluid-tightly closed by a diaphragm 24 which is made of a thin layer of flexible material such as a rubber. The periphery of the diaphragm 24 is nipped under compression between the underside of the partition plate 20 and a shoulder portion of the cap member 16 adjacent the cylindrical portion thereof. Thus, the underside of the partition plate 20 and the diaphragm 24 cooperates to define an equilibrium chamber 26 which is variable in its volume. The operating chamber 22 and the equilibrium chamber 26 are both filled with an incompressible fluid 28 such as water, polyalkylene glycols (e.g., polyethylene glycols), silicone oils and low-molecular weight polymers, or a mixture thereof.

The partition plate 20 dividing a space within the engine mount into the operating and equilibrium chambers 22 and 26 is a comparatively thick, generally planar member as shown in FIG. 1, and made of a rigid material such as metal on plastic so that there is substantially no deformation thereof upon input of a vibrational energy into the operating chamber 22. The partition plate 20 is provided with a peripheral circular groove 30 which is formed along a portion of the entire periphery of plate 20. One end of the circular groove 30 is connected for fluid communication to the operating chamber 22 through a first passage 32 formed in the plate 20. Similarly, the other end of the circular groove 30 is put in fluid communication with the equilibrium chamber 26 through a second passage 34 also formed in the plate 20. The circular groove 30 cooperates with an inner surface of the cylindrical portion of the cap member 26 to form a circular passage which in turn cooperates with the first and second passages 32 and 34 to define an orifice 36 through which the incompressible fluid flows from one of the operating and equilibrium chambers 22, 26 to the other.

Figure 2:
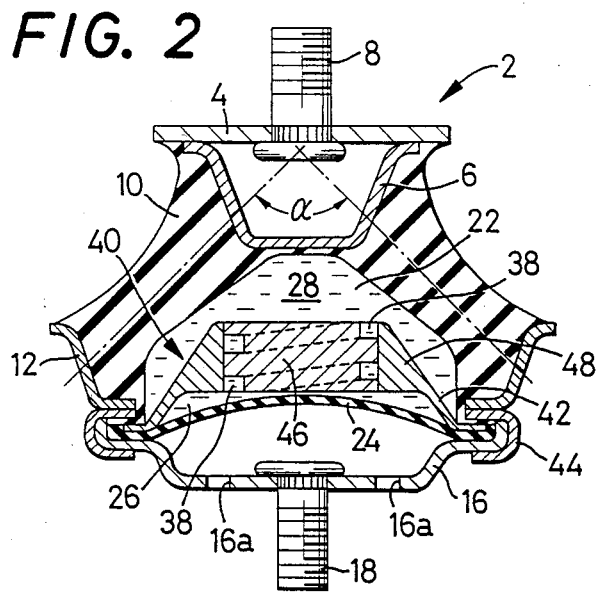

Referring next to FIG. 2, there is illustrated an alternative embodiment of a vibration-damping structure which is different from the preceding embodiment of FIG. 1 in that an orifice 38 is provided in the form of a spiral groove formed in a central part of a partition member 40.

Described in more detail, the partition member 40 used in this alternative embodiment includes a leg portion 42 which flares radially outwardly toward the peripheries of the diaphragm 24 and the cap member 16 such that the partition member 40, diaphragm 24 and cap member 16 are held together at their peripheries in a fluid tight manner under compression by a clamp 44, whereby the operating chamber 22 is formed between the partition member 40 and the elastic block 10, and the variable-volume equilibrium chamber 26 is formed between the partition member 40 and the diaphragm 24.

The partition member 40 comprises a cylindrical core member 46 which has the peripheral spiral orifice 38, and an outer member 48 which includes the previously described leg portion 42 and has a central opening in which the cylindrical core member 46 is fixedly fitted such that the orifice 38 of a suitable length is formed through the partition member 40 for fluid communication between the operating and equilibrium chambers 22 and 26. Other parts of this modified vibration-damping structure are identical to the corresponding parts of the preceding embodiment of FIG. 1, and their detailed description is omitted herein by way of using the same reference numerals to identify the corresponding parts.

In the above embodiments, the cavity formed in the bottom portion of the elastic block 10 serves to define a generally truncated conical wall portion of the block 10. The configuration of this wall portion is determined such that two opposite sides in vertical cross section of FIGS. 1 and 2 are adapted to form an angle $\alpha$ of about 90 degrees. More specifically, the vertical angle $\alpha$ of an imaginary triangle in cross section of the conical wall of the block 10 taken in a direction of a vibrational energy input is about 90 degrees as measured at a point of intersection of lines extending through the middle of a thickness of the conical wall from the base toward the top of the elastic block 10, as shown in FIGS. 1 and 2. In other words, the angle of the conical wall is about 45 degrees with respect to the centerline of the elastic block 10, i.e., the direction of vibrational energy input.

Upon input of a vibrational energy into the damping structures constructed as described hereinbefore, a variation in the volume of the fluid chamber (operating chamber 22) is held to a minimum. In other words, the elastic block 10, for example, is constructed such that a portion thereof adjacent to the seat 6 will be expanded to a practically minimum extent toward the operating chamber 22 as indicated in two-dot broken line in FIG. 1. With such construction, the dynamic/static ratio $Kd(100)/Ks$ is adapted to be not greater than 2.1, and the vibrational noise level at high frequencies is held at a significantly reduced level, which is one of the objects of the invention. It is further noted that the partition means 20 or 40 defining the operating and equilibrium chambers 22 and 26 on the opposite sides is fabricated of a rigid material so that the partition means will not be deformed, deflected or moved by the action of the fluid pressure in the operating chamber 22 during application of vibrations to the structure. Therefore, the instant structure is completely free from otherwise possible resonance oscillation of a mass of the fluid supporting a movable part or plate used in the known fluid-filled elastic mount. In this way, the conventional drawback of a sudden variation in the transfer of force due to the resonance oscillation is eliminated with a result of providing improved transfer characteristics in relation to the frequency of vibrations applied, that is, a force transferred through the instant structure is smoothly varied as the frequency of vibration is changed. In the meantime, low-frequency vibrations applied are effectively damped or absorbed in the form of an energy loss which is caused by a flow resistance of the incompressible fluid flowing through the orifice 36 or 38 between the two chambers 22 and 28, whereby an effectively high loss factor and accordingly sufficiently high damping properties are obtained at varying low frequencies of vibrations.

The above indicated operational results and effects will be more readily understood and become more apparent from analyzing the following factual data which represents a part of the various experiments conducted by the inventor.

TABLE 1 shows the data of examples of engine mounts of the present invention using the elastic block 10 with the vertical angle $\alpha$ of approx. 90 degrees, in comparison with comparative examples using an elastic block with the vertical angle $\alpha$ of approx. 120 degrees.

TABLE 1

|  | L/D = 5 | | | L/D = 10 | | | L/D = 20 | | |
|---|---|---|---|---|---|---|---|---|---|
| ORIFICE DIAMETER (mm) | 7.3 | 8.5 | 9.6 | 7.3 | 8.5 | 9.6 | 7.3 | 8.5 | 9.6 |
| COMPARATIVE EXAMPLES (α= APPROX. 120°) | | | | | | | | | |
| l10 | 0.2 | 0.3 | 0.4 | 0.3 | 0.4 | 0.5 | 1.26 | 1.28 | 1.13 |
| Kd100 | 41 | 41 | 41 | 41 | 41 | 41 | 41 | 41 | 41 |
| Kd/Ks | 2.9 | 2.9 | 2.9 | 2.9 | 2.9 | 2.9 | 2.9 | 2.9 | 2.9 |
| TRANSMISSIBILITY | 0.0129 | 0.0129 | 0.0129 | 0.0129 | 0.0129 | 0.0129 | 0.0129 | 0.0129 | 0.0129 |
| EXAMPLES OF THE INVENTION (α= APPROX. 90°) | | | | | | | | | |
| l10 | 0.10 | 0.15 | 0.2 | 0.15 | 0.2 | 0.3 | 0.45 | 0.57 | 0.67 |
| Kd100 | 25 | 25 | 25 | 25 | 25 | 25 | 25 | 25 | 25 |
| Kd/Ks | 1.8 | 1.8 | 1.8 | 1.8 | 1.8 | 1.8 | 1.8 | 1.8 | 1.8 |
| TRANSMISSIBILITY | 0.0078 | 0.0078 | 0.0078 | 0.0078 | 0.0078 | 0.0078 | 0.0078 | 0.0078 | 0.0078 |

|  | L/D = 40 | | | L/D = 60 | | |
|---|---|---|---|---|---|---|
| ORIFICE DIAMETER (mm) | 7.3 | 8.5 | 9.6 | 7.3 | 8.5 | 9.6 |
| COMPARATIVE EXAMPLES (α= APPROX. 120°) | | | | | | |
| l10 | 0.3 | 0.4 | 0.5 | 0.2 | 0.3 | 0.4 |
| Kd100 | 41 | 41 | 41 | 41 | 41 | 41 |
| Kd/Ks | 2.9 | 2.9 | 2.9 | 2.9 | 2.9 | 2.9 |
| TRANSMISSIBILITY | 0.0129 | 0.0129 | 0.0129 | 0.0129 | 0.0129 | 0.0129 |
| EXAMPLES OF THE INVENTION (α= APPROX. 90°) | | | | | | |
| L10 | 0.15 | 0.2 | 0.3 | 0.10 | 0.15 | 0.2 |
| KD100 | 25 | 25 | 25 | 25 | 25 | 25 |
| Kd/Ks | 1.8 | 1.8 | 1.8 | 1.8 | 1.8 | 1.8 |
| TRANSMISSIBILITY | 0.0078 | 0.0078 | 0.0078 | 0.0078 | 0.0078 | 0.0078 |

The indicated data was obtained on those examples with different L/D ratios of the orifice by changing a diameter thereof. All examples used have the same static spring rate Ks (14). In the table, l10 represents a loss factor obtained during application of vibrations of 10 Hz (low-frequency vibration), and Kd100 indicates a dynamic spring rate at 100 Hz (high frequency).

TABLE 2 shows a dynamic/static rate (Kd/Ks) and a transmissibility of engine mounts having different values of Kd100. From this table, it is apparent that a desired transmissibility is obtained with the dynamic/static ratio not greater than 2.1.

TABLE 2

| Kd100 | 25 | 28 | 35 | 41 |
|---|---|---|---|---|
| Kd/Ks | 1.8 | 2.0 | 2.5 | 2.9 |
| Transmissibility | 0.0078 | 0.0088 | 0.0110 | 0.0129 |

Figure 3:
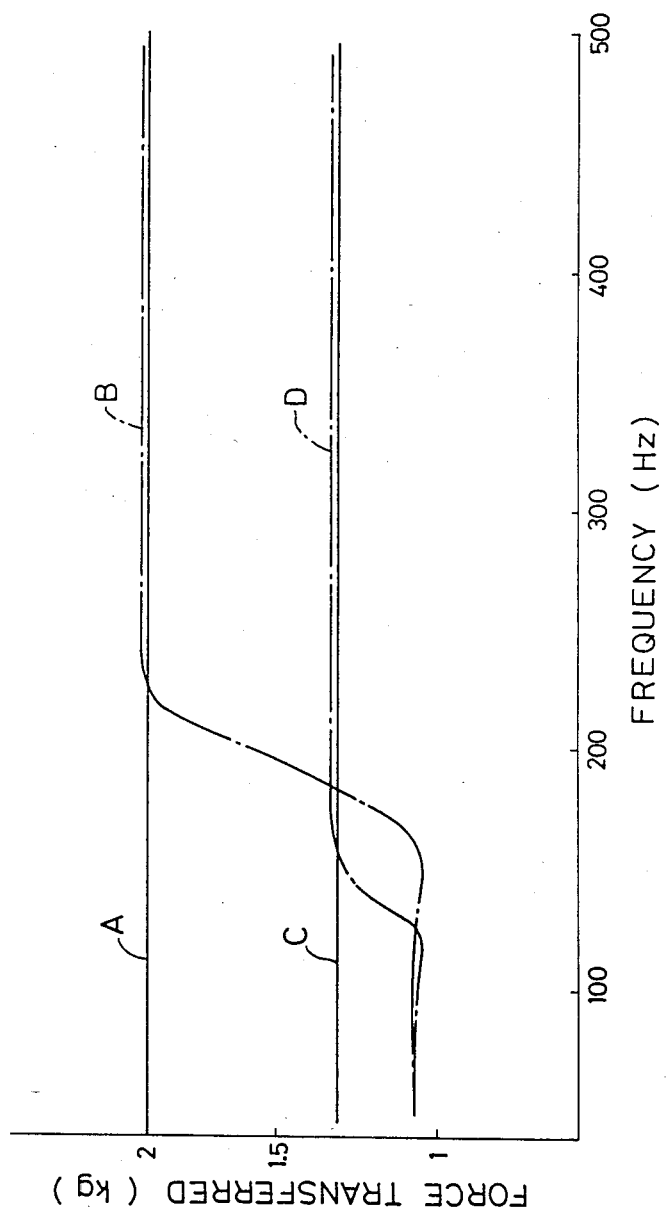
FIG. 3 is a graphical representation of transfer characteristics of the instant and known damping structures for purpose of comparison, showing a variation in transferred force in relation to a frequency of vibrations applied to the damping structures.

FIG. 3 represents transfer characteristics, i.e., a force transferred (kg) varying with the frequency of vibrations, of four different engine mounts. Example A has an vertical angle α of approx. 120 degrees and a rigid partition wall (plate). Example B has an vertical angle α of approx. 120 degrees but a partition wall with a movable plate. Example C is an engine mount having a vertical angle α of approx. 90 degrees and a rigid partition wall, and Example D is an engine mount having a vertical angle α of approx. 90 degrees but a partition wall with a movable plate.

As is apparent from the graphs, the engine mounts B and D having the partition wall with a movable plate exhibit unfavourable transfer characteristics because of an abrupt rise of the force transferred at high frequencies (higher than 100 Hz), and are therefore incapable of a smooth transfer of vibrational forces. On the contrary, the engine mounts A and C having the rigid partition wall have no variation in the transferred force over the entire range of frequency indicated, that is, a constant force is transferred through these engine mounts A and C. In particular, the engine mount C (constructed according to the invention) is excellent for its comparatively low constant level of force transfer.

Further, tests to obtain a loss factor l10 at 10 Hz were conducted on engine mounts which have different L/D ratios but which all have a dynamic spring rate Kd100 of 22, a dynamic/static ratio Kd/Ks of 1.6, and a transmissibility of 0.0069. The test results are listed in TABLE 3.

TABLE 3

|  | L/D = 5 | | | L/D = 10 | | | L/D = 20 | | | L/D = 40 | | | L/D = 60 | | |
|---|---|---|---|---|---|---|---|---|---|---|---|---|---|---|---|
| Orifice Dia.(mm) | 7.3 | 8.5 | 9.6 | 7.3 | 8.5 | 9.6 | 7.3 | 8.5 | 9.6 | 7.3 | 8.5 | 9.6 | 7.3 | 8.5 | 9.6 |
| l10 | 0.08 | 0.13 | 0.16 | 0.13 | 0.16 | 0.26 | 0.36 | 0.47 | 0.54 | 0.13 | 0.16 | 0.6 | 0.08 | 0.13 | 0.16 |

As indicated heretofore, the fluid-filled engine mounts according to the invention are provided with rigid partition means without a movable plate or part, and constructed for reduced variation in the volume of the operating chamber upon vibrational energy input, so that the dynamic/static ratio is not greater than 2.1, preferably within a range of 1.6–2.1. The instant engine mount is thus improved in its damping properties at low frequencies (because the loss factor is maintained at a relatively high level) and also at high frequencies, and excellent in its transfer characteristics. While the basis or reasons for these advantageous operational results of the invention have not been made fully clear, it is presumed that upon application of vibrations of high frequencies, the fluid in the operating chamber is merely pressurized in response to deformation of the elastic block because of difficulty of the fluid to flow through the orifice, that is, a given magnitude of force transferred by the pressurized fluid (dynamic spring rate Kd of the fluid multiplied by amplitude of vibration) is merely added to the force transferred by the elastic block (dynamic spring rate Kd of elastic block multiplied by amplitude of vibration). It is further presumed that the smooth transfer characteristics of the elastic block at high frequencies enable the engine mount to effect a smooth constant transfer of relatively small forces (Kd multiplied by amplitude), thereby contributing to excellent damping properties of the engine mount as a whole at high frequencies of vibrations.

As previously stated, unlike the prior fluid-filled engine mount provided with a movable plate, the partition means used in the instant vibration-damping structure is not provided with such movable plate or part. All that is required in connection with the partition means is to give a sufficient rigidity to the partition wall and provide an orifice which connects the operating and equilibrium chambers. Thus, the engine mount is significantly simple in design and construction, easy and economical to manufacture and assemble, and composed of relatively few parts, which serve to provide improvements in quality of the engine mounts at reduced costs.

Further, to maintain the dynamic/static ratio Kd/Ks not greater than 2.1, preferably within a range of 1.6–2.1 for vibrations of high frequencies (50–200 Hz), the configuration of the elastic block 10 is suitably selected so that the variation in volume of the operating chamber 22 is held to a minimum. In this respect, it is generally appreciated that the vertical angle α of the truncated conical portion of the block 10 be held relatively small, within a range from 20 to 116 degrees, or the angle of the conical wall to a line of vibrational energy input (to the centerline of the elastic block 10) be held within a range of 10–58 degrees.

While the orifice 36 or 38 of the previously described specific embodiments is provided in partition means for effecting fluid communications between the operating and equilibrium chambers 22, 26, such orifices may take various other forms known in the art that meet the principle of the invention. For example, the orifice may be provided in the form of an opening formed in a single planar member or in the form of a passage defined by two superposed planar members. Further, the orifice need not be defined solely by the partition means. Instead, it may be defined by the partition means and an adjacent member to support the partition means. In particular, the orifice may be provided as a circular annular groove which is formed in the periphery of the partition means and closed by an opposite surface of the support member. For effectively attaining the objects of the invention, the diameter D of the orifice is preferably held in a range of 3–12 mm. In case the orifice is not circular in cross section, the cross sectional area of the orifice is preferably equal to the area of a circle having a diameter of 3–12 mm. Further, it is preferred that the ratio of the length L to the diameter D of the orifice (L/D ratio) be held in a range of 10–40. This L/D ratio is particularly important in practicing the invention. With the L/D ratio held in the preferred range, the damping structure of the invention may provide its maximum operational result.

While the present invention has been described in its preferred embodiments, it is to be understood that the invention is by no means limited thereto, but various changes and modifications will occur to those skilled in the art without departing from the scope of the invention, and it is intended to cover in the appended claims all such changes and modifications.

Although the foregoing embodiments of the invention are associated with engine mounts, the invention may be embodied in other forms of vibration-damping structures, for example, body mounts in a vehicle.

What is claimed is:

1. A vibration-damping structure disposed in association with a vibration-generating element and a rigid support for connection of the former with the latter in a vibration damping manner, comprising:
   an elastic block having therein a cavity which is open at one end of the elastic block;
   support means integrally united with said elastic block;
   partition means disposed adjacent said one end of the elastic block so as to close said cavity, thereby cooperating with said elastic block to define, on one side thereof, an operating chamber which is located substantially within the mass of the elastic block and filled with an incompressible fluid;
   a diaphragm disposed on the other side of said partition means and cooperating with the same to define, on said other side, an equilibrium chamber which is filled with said incompressible fluid, at least a portion of said diaphragm being made of a thin layer of flexible material whereby said equilibrium chamber is variable in its volume; and
   passage means for defining an orifice connecting said operating chamber and said equilibrium chamber in fluid communication with each other,
   said partition means being made of a rigid material and constructed such that there is substantially no deformation thereof upon input of a vibrational energy into said operating chamber, a dynamic/static ratio of a dynamic spring rate of the vibration-damping structure to a static spring rate of the same being not greater than 2.1 for high-frequency vibrations of higher than 50 Hz.

2. A vibration-damping structure as recited in claim 1, wherein a ratio of a length of said orifice to a diameter thereof is in a range of 10–40.

3. A vibration-damping structure as recited in claim 1, wherein said dynamic/static ratio is not less than 1.6.

4. A vibration-damping structure as recited in claim 1, wherein said dynamic/static ratio is not greater than 2.1 for vibrations of 50–200 Hz.

5. A vibration-damping structure as recited in claim 1, wherein said partition means comprises said passage means.

6. A vibration-damping structure as recited in claim 5, wherein said partition means has a circular groove, a first passage connecting said operating chamber and said circular groove, and a second passage connecting said circular groove and said equilibrium chamber, said passage means comprising said circular groove and said first and second passages.

7. A vibration-damping structure as recited in claim 5, wherein said partition means has a substantially flat surface on said one side thereof.

8. A vibration-damping structure as recited in claim 5, wherein said partition means includes a cylindrical core member and an outer member having a central opening in which said cylindrical core member is fitted, said cylindrical core member having a spiral groove in its cylindrical surface, said spiral groove cooperating with an inner surface of said central opening to constitute said orifice connecting said operating and equilibrium chambers.

9. A vibration-damping structure as recited in claim 1, wherein a cross sectional area of said orifice is equal to an area of a circle having a diameter of 3–12 mm.

10. A vibration-damping structure as recited in claim 1, wherein said elastic block includes a generally truncated cone portion which defines said cavity at a base thereof, at least a part of said support means being disposed at a top of said truncated cone portion for connection to one of said vibration-generating element and said rigid member.

11. A vibration-damping structure as recited in claim 10, wherein said truncated cone portion has two opposite sides extending between said top and base in vertical cross section taken in a direction of said vibrational energy input, said two opposite sides forming an angle of 20–116 degrees.

12. The vibration-damping structure recited in claim 11, wherein said angle is approximately 90°.

13. A vibration-damping structure as recited in claim 1, further comprising another support means for supporting said partition means and said diaphragm at their peripheries.

14. A vibration-damping structure as recited in claim 13, wherein said another support means comprises a rigid member for connection to one of said vibration-generating element and said rigid support, and a clamp member for clamping said partition means, diaphragm and rigid member at their peripheries.

15. A vibration-damping structure as recited in claim 13, wherein said support means comprises a first rigid member disposed on one side of said elastic member remote from said cavity, and said another support means comprises a second rigid member and a clamp member for clamping said partition means, diaphragm and second rigid member at their peripheries, said first rigid member being constructed for connection of the structure to one of said vibration-generating element and said rigid support, and said second rigid member being constructed for connection of the structure to the other of said vibration-generating element and said rigid member.

16. A vibration-damping engine mount disposed between an engine of a vehicle and a structure of the vehicle for supporting the former on the latter in a vibration damping manner, comprising:

an elastic block including a generally truncated cone portion having therein a cavity which is open at a base of said truncated cone portion, said cone portion having a top and two opposite sides extending between said top and said base in vertical cross section taken in a direction of input of vibrational energy, said two opposite sides forming an angle of between 20° and 116°;

support means integrally united with said elastic block, at least a part of said support means being disposed at a top of said truncated cone portion for connection to one of said engine and said structure of the vehicle;

partition means disposed adjacent said base of the truncated cone portion so as to close said cavity, thereby cooperating with said elastic block to define, on one side thereof, an operating chamber which is located substantially within the mass of the elastic block and filled with an incompressible fluid;

a diaphram disposed on the other side of said partition means and cooperating with the same to define, on said other side, an equilibrium chamber which is filled with said incompressible fluid, at least a portion of said diaphragm being made of a thin layer of flexible material whereby said equilibrium chamber is variable in its volume; and passage means for defining an orifice connecting said operating chamber and said equilibrium chamber in fluid communication with each other, said partition means being made of a rigid material and constructed such that there is substantially no deformation thereof upon input of a vibrational energy into said operating chamber, a dynamic/static ratio of a dynamic spring rate of the engine mounted to a static spring rate of the same being not greater than 2.1 for high-frequency vibrations of higher than 50 Hz.

17. The vibration-damping engine mount recited in claim 16, wherein said angle is approximately 90°.

* * * * *